Sept. 18, 1934.  C. W. KEMPTON  1,974,282
ROTARY INTERNAL COMBUSTION MOTOR
Filed Feb. 2, 1931   2 Sheets-Sheet 1
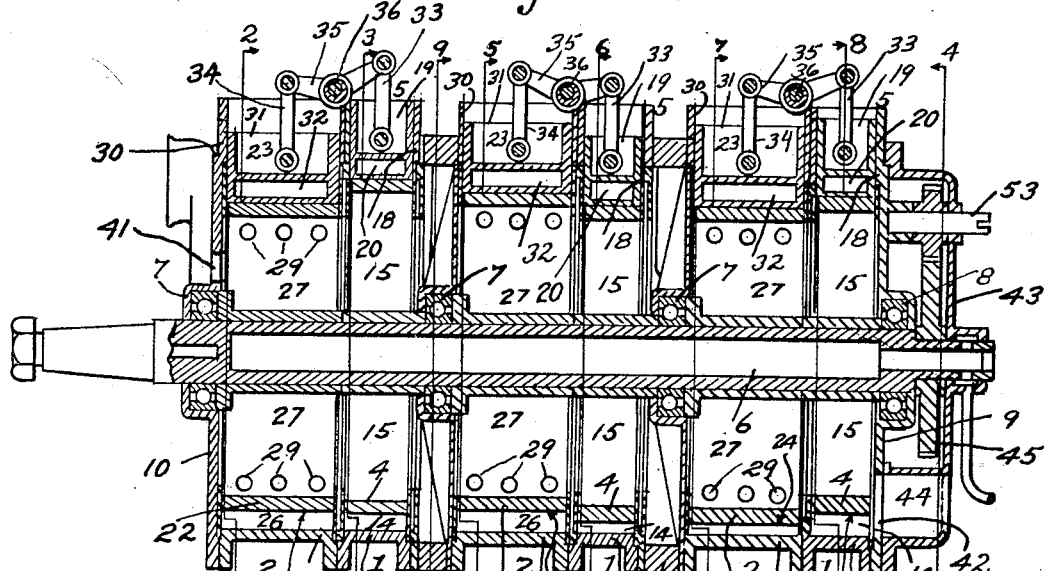
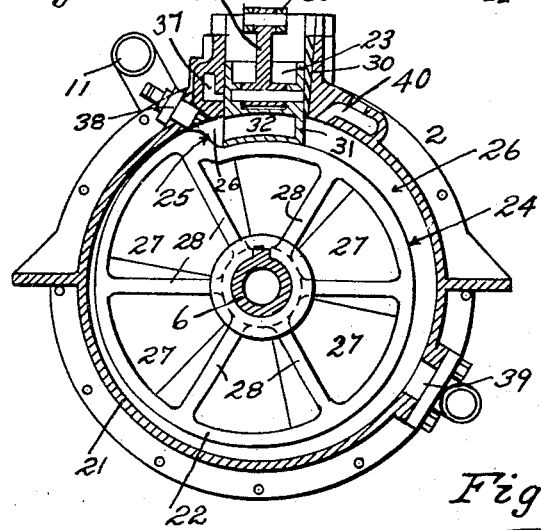
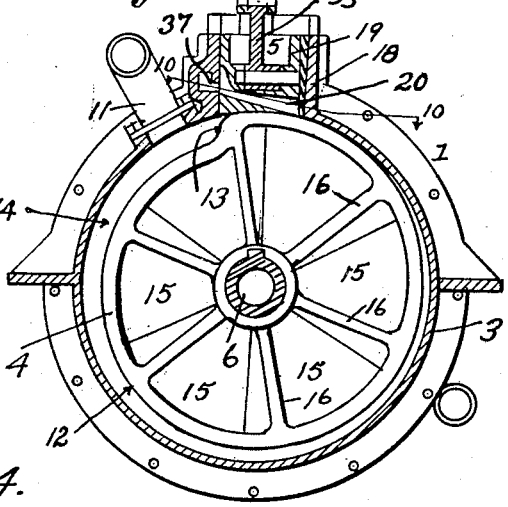
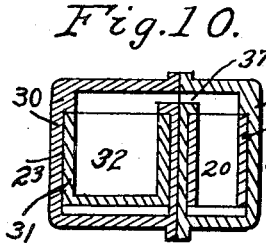
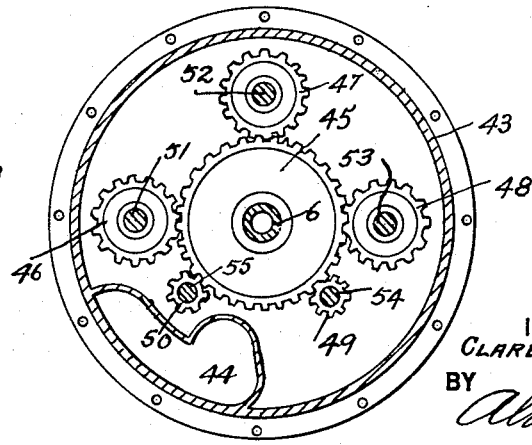
INVENTOR
CLARENCE W. KEMPTON.
BY Alan Franklin
ATTORNEY.

Sept. 18, 1934.  C. W. KEMPTON  1,974,282
ROTARY INTERNAL COMBUSTION MOTOR
Filed Feb. 2, 1931  2 Sheets-Sheet 2
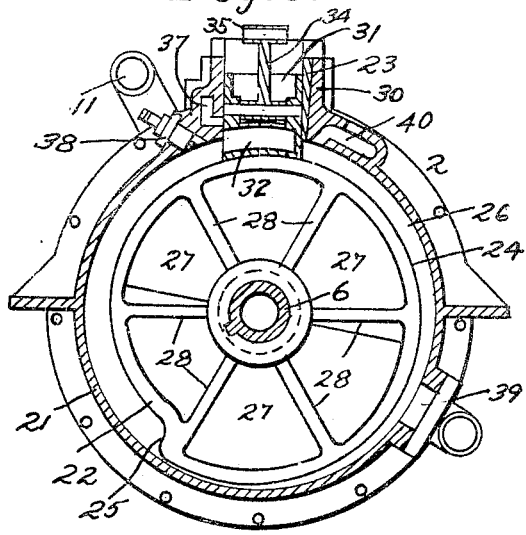
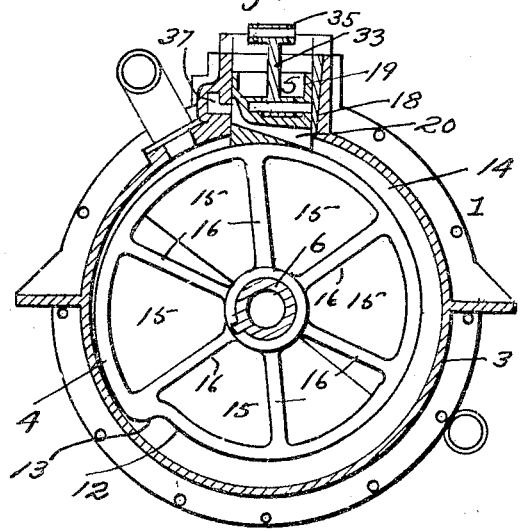
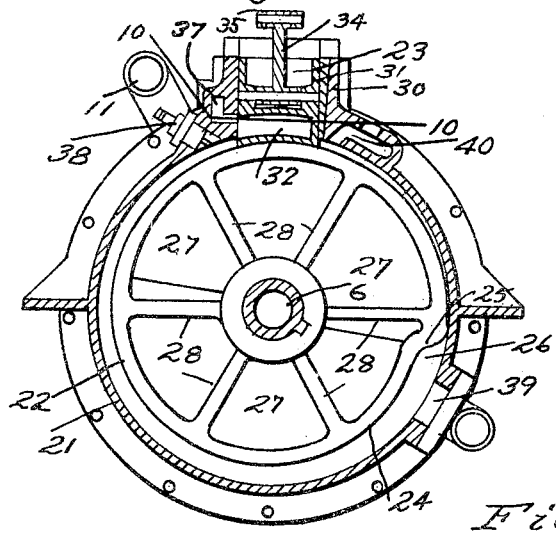
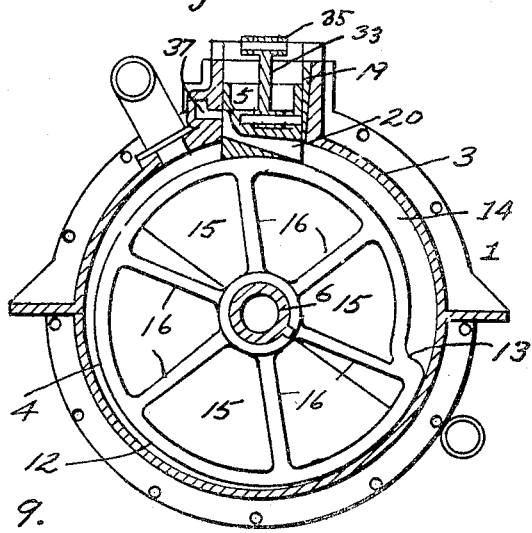
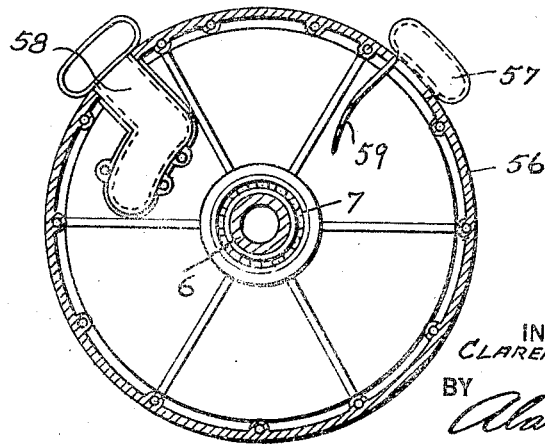
INVENTOR
CLARENCE W KEMPTON.
BY
Alan Franklin
ATTORNEY Patented Sept. 18, 1934

1,974,282

UNITED STATES PATENT OFFICE 1,974,282

ROTARY INTERNAL COMBUSTION MOTOR

Clarence W. Kempton, Los Angeles, Calif.

Application February 2, 1931, Serial No. 512,905

1 Claim. (Cl. 123—14)

This invention is a rotary internal combustion motor.

The general object of the invention is to provide a rotary internal combustion motor which is simple, durable, silent, economical and highly efficient.

A more particular object is to provide a rotary internal combustion motor of the character stated in which the gas is compressed before being introduced into the engine cylinder, and is ignited, expanded and exhausted in one revolution of the rotor-piston.

Another object is to provide a light-weight rotary internal combustion motor of the character stated which will be useful for all power purposes and particularly for aircraft.

Another object is to provide a rotary internal combustion motor with improved means for compressing the gases.

Another object is to provide a rotary internal combustion motor with an improved cooling system.

Another object is to provide a rotary internal combustion motor with improved ignition means.

Other objects and advantages will appear hereinafter.

The invention is illustrated in the annexed drawings which form a part of this specification and in which, Fig. 1 is a longitudinal section of a rotary internal combustion motor embodying my invention.

Fig. 2 is a transverse vertical section taken on line 2—2 of Fig. 1.

Fig. 3 is a transverse vertical section taken on line 3—3 of Fig. 1.

Fig. 4 is a transverse vertical section taken on line 4—4 of Fig. 1.

Fig. 5 is a transverse vertical section taken on line 5—5 of Fig. 1.

Fig. 6 is a transverse vertical section taken on line 6—6 of Fig. 1.

Fig. 7 is a transverse vertical section taken on line 7—7 of Fig. 1.

Fig. 8 is a transverse vertical section taken on line 8—8 of Fig. 1.

Fig. 9 is a transverse vertical section taken on line 9—9 of Fig. 1.

Fig. 10 is a sectional view of the valves taken on lines 10—10 of Figs. 3 and 7.

Corresponding parts are designated by the same reference characters in all the figures.

My motor comprises primarily a compressor unit 1 and a power unit 2.

The compressor unit 1 includes a cylinder 3, a rotary piston 4, and a compressor abutment-valve 5, the piston 4 being keyed on a shaft 6 which is journaled in bearings 7 and 8 in the head 9 of the compressor unit 1 and the head 10 of the power unit 2, respectively. The compressor cylinder 3 is constructed with a fuel intake 11 immediately forwardly of the compressor abutment-valve 5. The compressor piston 4 is formed with a spiral-shaped periphery 12, leaving a shoulder 13 between the outer and inner ends of the spiral convolution of said periphery and forming a compression chamber 14 in the compressor cylinder 3 between said spiral-shape piston periphery and the wall of said cylinder. The compressor piston 4 is hollow and is divided into a plurality of air circulating compartments 15 by radial partitions 16. The compressor valve 5 comprises a valve slideway 18 and a valve slide member 19 slidably fitted in said slideway, the valve slide member being provided with a port 20 extending transversely therethrough.

The power unit 2 comprises a cylinder 21, a piston 22 keyed on shaft 6 within said cylinder, and a power unit abutment-valve 23. The power piston 22 is formed with a spiral-shaped periphery 24, leaving a shoulder 25 between the outer and inner ends of the spiral convolution of said periphery and forming a combustion chamber 26 in the cylinder 21 between said spiral-shaped piston periphery and the wall of said cylinder. The power piston 22 is hollow and is divided into a plurality of air circulating compartments 27 by radial partitions 28, which partitions are provided with openings 29 through which air circulates from one compartment 27 to another. The power abutment-valve 23 comprises a valve slideway 30 and a valve slide member 31 slidably fitted in said slideway, the slide member being provided with a compression chamber 32. The compressor abutment-valve 5 and power abutment-valve 23 of the motor are connected respectively by links 33 and 34 to the ends respectively of a lever 35 which is fulcrumed at 36 on the valve slideway 30. In the walls of the slideways 18 and 30 of abutment-valves 5 and 23 are provided a port 37 leading from the abutment-valve 5 to the abutment-valve 23. In the power unit cylinder 21 a spark plug 38 is mounted immediately forwardly of the power abutment-valve 23 and said cylinder is provided with an exhaust 39 and an auxiliary exhaust 40, for completely scavenging the combustion chamber 26. The head 10 of the power cylinder 21 is provided with a cooling air inlet 41, while the head 9 of the compressor cylinder 3 is provided with an air cooling outlet 42.

To the compressor head 9 is bolted a gear case 43 which is formed with an air outlet chamber 44 into which the air cooling outlet 42 leads.

On the motor shaft 6, within the gear case 43, is secured a gear 45 which meshes with pinions 46, 47, 48, 49 and 50 which are secured on shafts 51, 52, 53, 54 and 55 respectively, which shafts are suitably journaled on the compressor head 9. The shafts 51, 52, 53, 54 and 55 respectively drive the magneto, tachometer, generator, oil pump and gas pump (not shown) of the motor.

My motor may be built as a single motor comprising the parts above described or it may be constructed as a multiple motor as illustrated in Fig. 1 of the drawings.

When constructed as a multiple motor spacing chambers 56 are interposed between the compressor unit of each single motor member and the power unit of the adjacent single motor member. Each spacing chamber 56 is provided with an air cooling outlet 57 and an air cooling inlet 58, there being a baffle plate 59 for directing air out through said outlet. The outlet 57 of each spacing chamber 56 permits the escape of air from the adjoining compressor unit of a single motor member after the air has passed through the hollow pistons 22 and 4 respectively of the power unit 2 and the compressor unit 1 of said motor member. The inlet 58 of each spacing chamber 56 permits the entrance of air from the atmosphere into the piston 22 of the adjacent power unit of a single motor member.

The operation of my invention is as follows:

Assuming the piston 4 and abutment-valve 5 of the compressor unit 1 to be in the position shown in Fig. 3 fuel is admitted through intake 11 into the compression chamber 14 of the cylinder 3, and as said piston is rotated counter-clockwise said fuel is forced by the piston shoulder 13 through the compressor valve port 20, and port 37 (Fig. 6) into the power valve compression chamber 32, the compression abutment-valve 5 descending as the spiral periphery 12 of the piston 4 recedes from the cylindrical wall of the cylinder 3, and bringing the valve port 20 into communication with the compressor chamber 14, and the fuel is compressed in the compression chamber 14 and power valve compression chamber 32, (Figs. 6, 7 and 8) at which time the cam shoulder 13 engages and raises the compressor abutment-valve 5 (Fig. 3), shutting off communication between the compression chamber 14 and the valve port 20, while the lowest part of the spiral periphery 24 of power piston 22 passes under the power abutment-valve 23 and said valve, through the medium of link 33, lever 35 and link 34, is positively caused by compressor abutment-valve 5 to descend, simultaneously with said rising movement of the compressor valve until the power valve compression chamber 31 opens completely in the forward end of the combustion chamber 26 of the power unit 2 (Fig. 2). At this time the spark plug 38 ignites the gaseous fuel in the combustion chamber 26 and in the power valve compression chamber 31 and the piston 22 is thus rotated in a counter-clockwise direction (Figs. 2, 5, and 7). The products of combustion escape through the exhaust 39 when the piston shoulder 25 passes and uncovers said exhaust, and complete scavenging of the combustion chamber is effected through the auxiliary exhaust 40 when said shoulder reaches said auxiliary exhaust.

When constructed as a single motor my motor is cooled by atmospheric air entering the inlet 41 and circulating through the hollow pistons 22 and 4 of the power unit 2 and compressor unit 1 and finally passing out through the outlet 42 and outlet chamber 44.

When constructed as a multiple motor air is circulated through each single motor member separately. Air enters the inlet 41 of the single motor member at the left end of the motor and passes through the hollow pistons 22 and 5 of said single motor member and out through the outlet 57 of the spacing chamber 56 between said single motor member and the next or intermediate single motor member. Air enters the inlet 58 of the spacing chamber 56 between the single motor member at the left end of the motor and the intermediate motor member and passes through the pistons 22 and 5 of said intermediate motor member and out through the outlet 57 of the spacing chamber 56 between the intermediate and right end motor members. Air enters the inlet 58 of the spacing chamber 56 between the intermediate and right end motor members and passes through the pistons 22 and 5 of said right end motor member and out through the outlet 42 and outlet chamber 44.

I do not limit my invention to the exact form herein disclosed because it may be embodied in other forms without departing from the spirit of the invention.

Having described my invention I claim:

An internal combustion motor comprising a compressor unit, a power unit, each of said units being formed with a cylinder and a piston, the periphery of which is of spiral formation and is formed with a cam shoulder at the adjoining ends of the convolution of said spiral periphery, the compressor unit including a slide abutment valve the inner end of which engages the periphery of the compressor unit piston, the power unit including a slide abutment valve formed with a compression chamber, the inner end of which engages the periphery of the power unit piston, means for conducting compressed fuel from said compressor valve to the combustion chamber of said power valve, said pistons being so arranged that when the compressor valve engages the lowest point of the compressor piston, the power valve will engage the highest point of the power piston and so that said valves will be moved in opposite directions whereby compressed fuel will be first forced by the compressor piston through said compressor valve into the compression chamber of said power valve and from said power valve compression chamber the compressed fuel will pass into the combustion chamber of said power unit, means for igniting the compressed fuel in said combustion chamber and means for exhausting the products of combustion from said combustion chamber.

CLARENCE W. KEMPTON.